United States Patent [19]

Ebaugh et al.

[11] Patent Number: 4,692,040
[45] Date of Patent: Sep. 8, 1987

[54] MULTIROW ROLLER BEARING WITH SEALS BETWEEN THE RACES

[75] Inventors: Roger L. Ebaugh, Winsted; Jerry P. Rhodes, Avon, both of Conn.

[73] Assignee: The Torrington Company, Torrington, Conn.

[21] Appl. No.: 904,763

[22] Filed: Sep. 5, 1986

Related U.S. Application Data

[63] Continuation of Ser. No. 730,835, May 6, 1985, abandoned.

[51] Int. Cl.4 ............................................. F16C 33/78
[52] U.S. Cl. .................................... 384/484; 277/50; 277/153; 384/477
[58] Field of Search ............... 277/35, 50, 152, 153; 384/470, 477, 482, 484, 485, 486, 487, 489, 564

[56] References Cited

U.S. PATENT DOCUMENTS

| 3,028,203 | 4/1962 | Lund et al. | 384/485 |
|---|---|---|---|
| 3,467,395 | 9/1969 | Kan | 384/485 X |
| 3,512,853 | 5/1970 | Petros | 384/478 X |
| 4,043,620 | 8/1977 | Otto | 384/485 |
| 4,325,591 | 4/1982 | Otto | 384/486 |
| 4,336,971 | 6/1982 | Reiter | 384/484 |
| 4,422,698 | 12/1983 | Aoki et al. | 384/482 |
| 4,428,630 | 1/1984 | Folger et al. | 277/153 X |
| 4,478,463 | 10/1984 | Takai et al. | 277/50 X |

FOREIGN PATENT DOCUMENTS 6995 1/1980 European Pat. Off. ............ 384/486

Primary Examiner—Daniel P. Stodola
Attorney, Agent, or Firm—Frank S. Troidl

[57] ABSTRACT

This is a multirow bearing for supporting a work or back-up roll of a rolling mill. A seal case is fitted within the annulus between the inner races and outer races. The seal case is configured to fit entirely within the annulus. The seal cases have elastomeric portions which cooperate with an inner race to form barriers at the ends of the bearing.

The inner races may comprise a pair of inner races separated by a sealed spacer.

3 Claims, 15 Drawing Figures

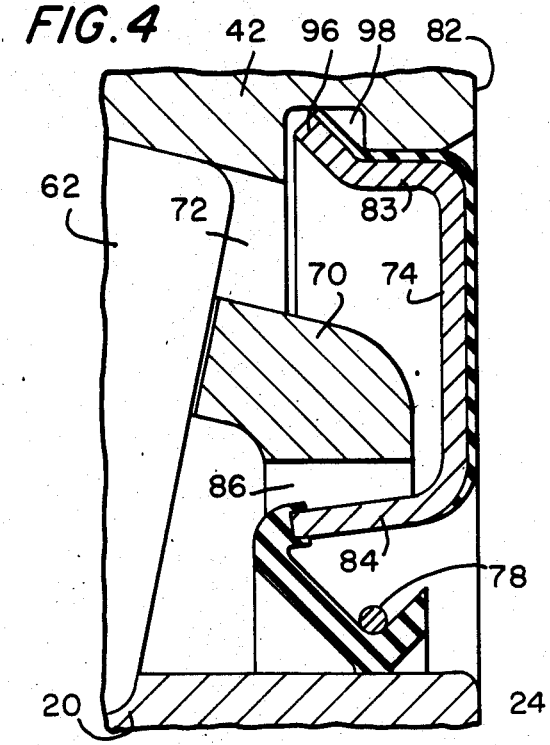
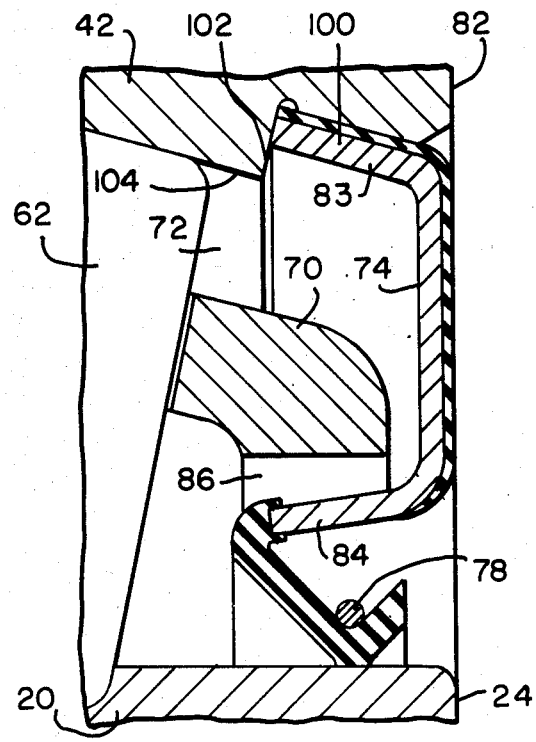
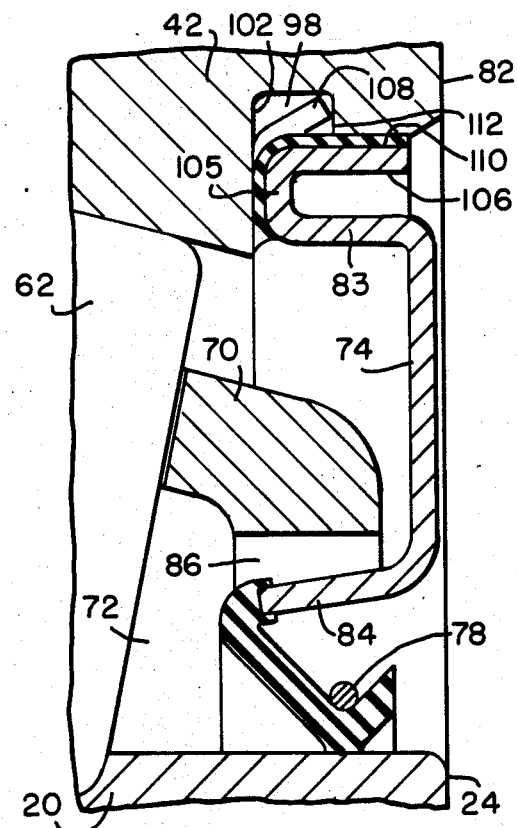
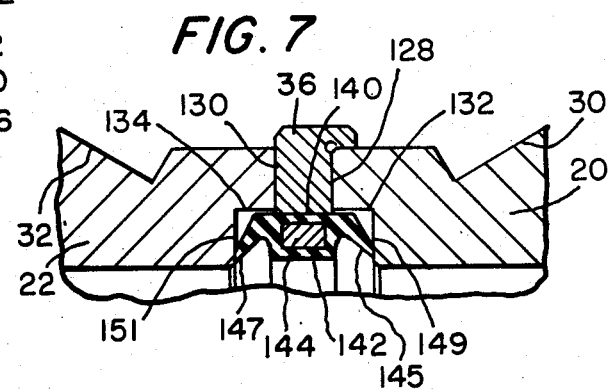
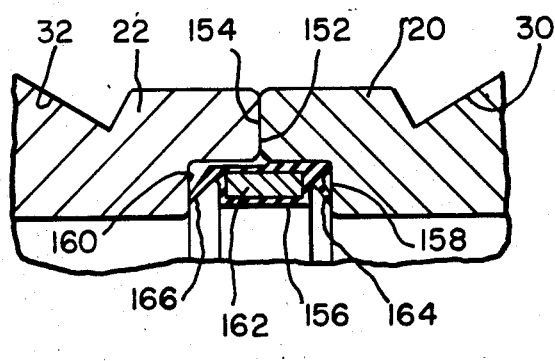

MULTIROW ROLLER BEARING WITH SEALS BETWEEN THE RACES

This application is a continuation of application Ser. No. 730,835 filed May 6, 1985, now abandoned.

This invention relates to bearings. More particularly, this invention is a new multirow bearing containing tapered rollers In the operation of rolling mills, such as those used in the steel industry, vast quantities of water frequently are employed for cooling purposes. Because of the tremendous forces involved in the operation of rolling mills, the roll bearings are lubricated with conventional oil-type lubricants. For operation at maximum efficiencies, it is essential to maintain the roll bearings free of water and other foreign materials.

To prevent contaminants from entering the bearing in a mill roll, the seals and location of the seals are highly important. The seals that protect one conventional roll neck bearing arrangement are remote from the bearings and are often damaged when the roll is removed for regrinding and thereafter replaced, which occurs frequently insofar as the work rolls are concerned. An example of a conventional roll neck bearing arrangement wherein the seals are remote from the bearings is contained in the U.S. Pat. No. 3,512,853 issued May 19, 1970 to A. J. Petros and entitled "Water and Lubricant Sealing Means for Mill Rolls".

In other conventional roll neck bearing arrangements, the seals which protect the bearings from contaminants are housed in end rings which are separate from the bearing outer race. Examples of such an arrangement are contained in U.S. Pat. No. 4,235,485 issued Nov. 25, 1980 to Gerhard Reiter and entitled "Unitized Multirow Tapered Roller Bearing" and U.S. Pat. No. 4,422,698 issued Dec. 27, 1983 to Akio Aoki, et al. and entitled "Bearing Assembly".

In the bearing of this invention the end seals are not mounted in separate rings and the end seals are not remote from the bearing itself. Rather the end seals are located in the inner race-outer race annulus. Since a separate ring is not necessary to house the end seals in applicant's invention, applicant's bearing assembly is cheaper to make and performs the same operations with fewer parts than the bearing assemblies such as those shown in U.S. Pat. No. 4,235,485 and U.S. Pat. No. 4,422,698. The bearing of this invention is also constructed such that a much less longitudinal space is required for the bearing end seals compared with the longitudinal space required by patents requiring separate end rings to support the end seals and bearings disclosed in patents where the seals are remotely spaced from the bearing such as U.S. Pat. No. 3,512,853 while still maintaining the same capacity as the bearings disclosed in such patents.

Briefly described the new multirow bearing comprises an inner race means having a pair of intermediate raceways and a pair of end raceways and an outer race means having a pair of intermediate raceways surrounding the intermediate raceways of the inner race means and a pair of end raceways surrounding the end raceways of the inner race means so that each raceway on the outer race means surrounds and corresponds to a different raceway on the inner race means. Rollers are arranged in rows between corresponding raceways of the inner and outer race means, there being a different row of rollers between each set of corresponding intermediate and end raceways. An end seal is fitted within the inner race means-outer race means annulus adjacent each end of the annulus. The end seals are configured to fit entirely within the annulus. Each end seal has an elastomeric portion which cooperates with the inner race means to form barriers at the ends of the bearing.

The inner race means may include a pair of inner races with each inner race providing the bearing with an intermediate raceway and an end raceway. The inner end faces of the inner races may abut one another directly or alternatively a spacer may separate the inner races. If the inner end faces of the inner races abut one another, means are provided for sealing the abutting inner end faces of the inner races. If the inner races are separated by a spacer, means are provided for sealing the spacer.

The invention as well as its many advantages may be further understood by reference to the following detailed description and drawings in which:

FIG. 4 is a fragmentary sectional view showing a still further embodiment of an end seal of the invention;

FIG. 5 is a fragmentary sectional view showing a still further end seal embodiment of the invention;

FIG. 6 is a fragmentary sectional view showing a still further embodiment of the invention;

FIG. 7 is a fragmentary sectional view showing a sealing arrangement embodiment when a spacer is used to separate the two inner races;

FIG. 8 is a fragmentary sectional view showing a sealing arrangement embodiment when the inner end faces of the inner races abut one another;

In the various figures like parts are referred to by like numbers.

Figure 1:
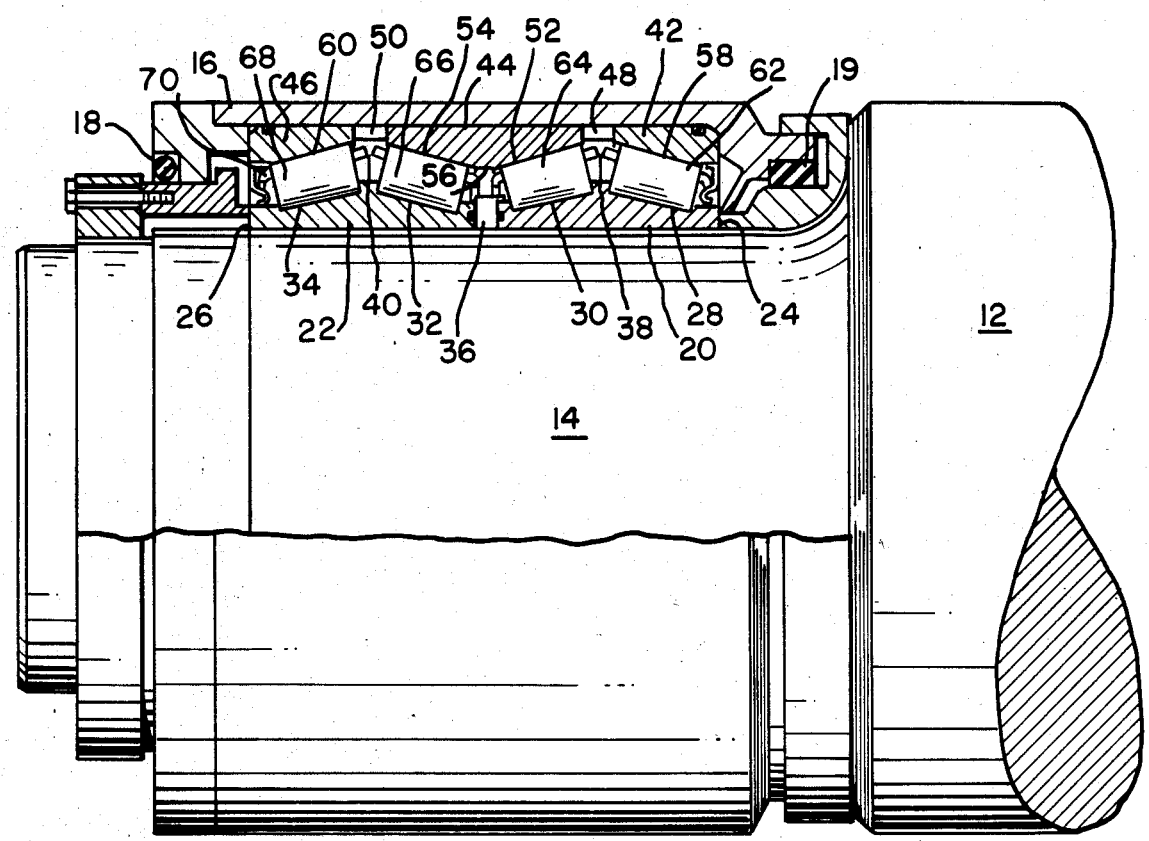
FIG. 1 is a fragmentary view, partly in section, of a rolling mill roll, the roll neck of which projects into a chock on the mill frame and is supported in the chock by the multirow bearing of the present invention.

Referring to the drawings and more particularly to FIG. 1, a multirow tapered roller bearing is shown which is particularly suitable for positioning and supporting a work or back-up roll 12 of a rolling mill. Each roll 12 of the mill has a roll neck 14 at its ends, these being reduced end portions, and each roll neck 14 is received in the bearing. The bearing in turn is clamped and held firmly in chocks 16 that are secured to the mill frame. The chocks 16 contain the usual retaining arrangements and are further provided with a conventional O-ring seal 18 and seal 19. Thus the bearing enables the roll 12 to rotate within the chock 16.

The bearing includes an inner race means which has a pair of inner races 20 and 22. The bores of the inner races 20 and 22 have the same diameter and the diameters of the bores are about the same as the roll neck 14, so that the roll neck 14 will fit through the bores of the inner raceways 20 and 22. Preferably the bores of the inner races are slightly larger in diameter than the diameter of the roll neck 14 so that a loose fit exists to facilitate removal of the bearing.

The inner races 20 and 22 have squared off transversely extending end faces 24 and 26, respectively, and between the two end faces 24 and 26 there is provided four tapered raceways 28, 30, 32, and 34. The inner races 20 and 22, each provide the bearing with an intermediate raceway 30 and 32, respectively, and an end raceway, 28 and 34, respectively. The two intermediate raceways 30 and 32 are separated by an annular spacer 36.

Separating the end raceway 28 and intermediate raceway 30 on inner race 20 is a cylindrical intervening surface 38 which merges into the larger diameter ends of the raceways 28 and 30. Separating the intermediate raceway 32 from end raceway 34 on inner race 22 is a cylindrical intervening surface 40 which merges into the larger diameter ends of the raceways 32 and 34. Raceways 28 and 30 taper radially inwardly from the intervening cylindrical surface 38. Raceways 32 and 34 taper radially inwardly away from the cylindrical intervening surface 40.

Surrounding the inner races 20 and 22 is an outer race means including segmented outer races 42, 44 and 46. Outer race 42 is axially separated from outer race 44 by an annular spacer 48. Outer race 44 is axially separated from outer race 46 by the annular spacer 50.

The outer race 44 has raceways 52 and 54 to thereby provide the bearing with intermediate raceways located opposite the corresponding intermediate raceways 30 and 32 on inner race 20 and inner race 22, respectively Separating the two intermediate raceways 52 and 54 on outer race 44 is a cylindrical intervening surface 56 which merges into the large diameter ends of the raceways 52 and 54. Raceways 52 and 54 taper radially outwardly away from the intervening cylindrical surface 56.

End raceway 58 on the outer race 42 tapers radially outwardly away from the outer end of the race 42 and surrounds and is located opposite to the corresponding end raceway 28 on inner race 20. End raceway 60 on the outer race 46 tapers radially outwardly away from the outer end of the race 46 and is located opposite to the corresponding end raceway 34 on the race 22.

Between the corresponding end raceways 28 and 58 is a single roll of tapered rollers 62; similarly between the intermediate raceways 30 and 52 is another row of tapered rollers 64; between the intermediate raceways 32 and 54 is still another row of tapered rollers 66; and between the end raceways 34 and 60 is another row of tapered rollers 68.

The proper circumferential spacing between the individual rollers of each of the four rows is maintained by cages 70. The individual cages 70 for any row of rollers are detached from one another and may be made of plastic or any other suitable material. Two of the cages provide the bearing with intermediate cages corresponding to the intermediate raceways and two of the cages provide the bearing with end cages corresponding to the end raceways.

Figure 2:
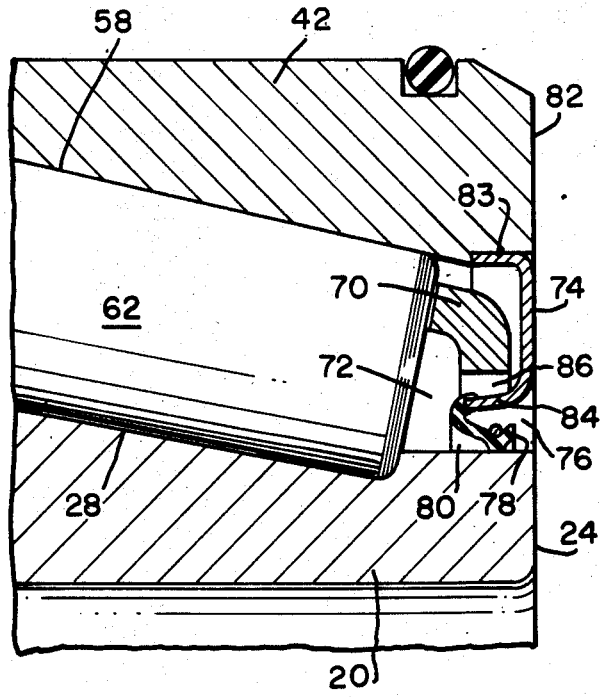
FIG. 2 is a fragmentary section view showing one end seal embodiment of the invention.

Referring to FIG. 1 and FIG. 2, note that end seals are fitted within the inner race means-outer race means annulus 72 and adjacent each end of the annulus. The end seals each include a seal case 74 and an annular elastomeric portion 76. A separate garter spring 78 provides positive contact against the extension 80 of the inner race outside diameter.

The axial outer surface 24 of the inner race 20 and the axial outer surface 82 of the outer race 42 extend along the same transverse plain through the axis of the bearing. The end seal is configured to fit entirely within the annulus 72. The seal case 74 is generally C-shaped in cross section with the vertical portion of the C-shape extending generally along the same transverse plain as the surfaces 24 and 82 on inner race 20 and outer race 42, respectively. The horizontal parts of the C-shaped seal case are the generally axially extending radially outer portion 83 and the generally axially extending radially inner portion 84. As more clearly shown in FIG. 3, the axially extending outer portion 83 is shorter than the axially extending inner portion 84. The elastomeric portion 76 is attached to the axially extending portion 84.

The cross bars of each roller cage 70 are inclined with the bore 86 in its end rim of small diameter being larger than the outside diameter of the adjacent part of the inner raceway means. The axially extending portion 84 of the seal case extends into the bore 86 of the end cage 70.

In the embodiment of FIG. 2 the seal case is retained firmly in a counter bore formed on the inner surface of the outer race 42. The seal case is pressed by a press fit into the counter bore by inserting the end seal into the counter bore from right to left looking at FIG. 2

Figure 3:
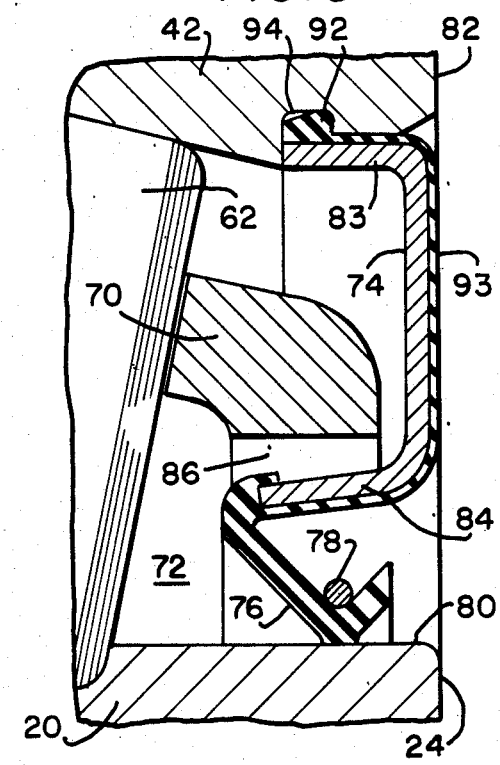
FIG. 3 is a fragmentary sectional view showing a further end seal embodiment of the invention.

In the embodiment of FIG. 3, the end seal is kept in the inner race means-outer race means annulus 72 by a molded annular rubber bead 92 on the outside diameter of an elastomeric 93 covering the seal case 74. The rubber bead expands into an annular groove 94 in the inside surface of the outer race 42. Annular groove 94 is axially spaced from end surface 82. The end seal is inserted into the annulus 72 by pressing the end seal into the annulus from right to left looking at FIG. 3.

In the embodiment of FIG. 4, the metal portion of the end seal is rubber coated for positive sealing. The mechanical retention is provided by peening the outer portion 96 of the generally axially extending portion 83 into the groove 98 formed in the outer race 42

In the embodiment of FIG. 5, the seal case has a rubber coated radially outside portion 100 which is inclined. A counter bore having a correspondingly inclined surface is formed in the inside surface of the outer race 42. The end seal is installed by inserting the end seal in the inner race means-outer race means annulus 72 from left to right looking at FIG. 5. The direction of installation allows the seal case to pass by the surface 104 smaller than itself, bending the outside surface inwardly and spring into the final position shown in FIG. 5. having cleared the shoulder 102.

In the embodiment of FIG. 6, the end seal case includes a radially extending portion 105 integral with the portion 83 and a portion 106 which extends axially away from shoulder 102 and parallel to portion 83. A plurality of circumferentially separated tabs 108 (only one shown in FIG. 6) are preformed to form retention tabs. The seal case is rubber coated at 110. Prebending the tabs 108 outwardly gives them positive residual strain energy so they spring back into the groove 98 when the retention tabs pass the shoulder 112. The rubber coating 110 and case are constructed so positive compression is afforded thereby sealing the surface while forcing the retaining tabs 108 into the outer race groove 98

Figure 11:
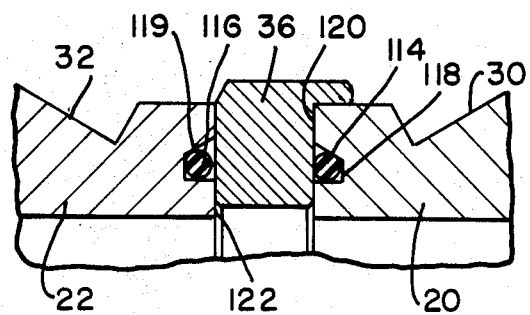
FIG. 11 is a fragmentary sectional view of a further embodiment of a sealing arrangement when the inner races are separated by a spacer.

The spacer 36 shown in FIG. 1 is also sealed to prevent contaminants from flowing in the spaces between the inner ends of the races 20 and 22. The sealing arrangement for the spacer 36 of FIG. 1 is shown in more detail in FIG. 11. Referring to FIG. 11 O-rings 114 and 116 are fitted into annular grooves 118 and 119, respectively, formed on the inner end faces 120 and 122 of the inner races 20 and 22.

In the spacer sealing arrangement shown in FIG. 7, counter bores are formed in the inner end faces 128 and 130, respectively, of the inner races 20 and 22, respectively. The side surfaces 132 and 134 of the counter bores and the inside surface 140 of the spacer 36 form an annular space which receives a sealing member comprising an annular member having an elastomeric portion 142 molded around a metal band 144. Lip seals 145 and 147 are in contact with the bottom surfaces 149 and 151, respectively of the counterbores.

Figure 14:
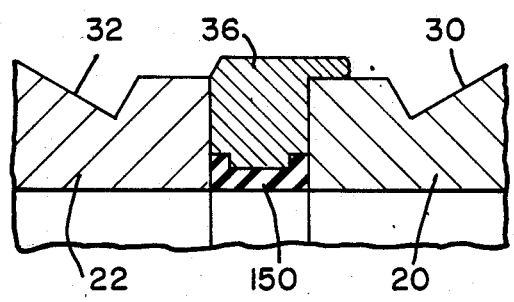
FIG. 14 is a fragmentary sectional view of a further embodiment of a sealing arrangement when the inner races are separated by a spacer.

In the spacer sealing means shown in FIG. 14, the spacer has a central bore and counter bores of greater diameter than the central bore extending from each end of the spacer to provide an annular space having a U-shaped cross section. An annular elastomeric seal 150 having a U-shaped cross section is enclosed in the annular space.

Figure 15:
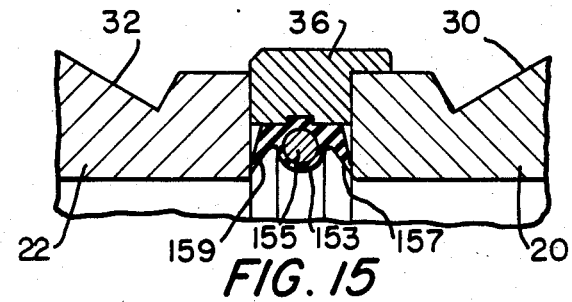
FIG. 15 is a fragmentary sectional view of a further embodiment of a sealing arrangement when the inner races are separated by a spacer.

In the spacer sealing means shown in FIG. 15, the bore of spacer 36 is larger than the bores through races 20 and 22. The sealing member includes an annular elastomer 153 molded around a metal ring 155. Lip seals 157 and 159 form part of the elastomer 153 and engage races 20 and 22, respectively.

With some roll mill bearings, a spacer may not be included as part of the inner race means. In such cases the inner end faces of the inner races will abut and some means should be provided for sealing the abutting inner end faces of the inner races. Different means for sealing the abutting end faces of the inner races are shown in FIG. 8, FIG. 9, FIG. 10, FIG. 12, and FIG. 13. Referring to FIG. 8, the abutting end faces 152 and 154 of the inner races 20 and 22 are sealed by an elastomeric seal 156 fitted into the adjacent counter bores 158 and 160 formed in the inner end faces of the inner races 20 and 22, respectively. A centrally located completely elastomeric encased rectangular metal band 162 provides for rigidity of the seal. Lip seals 164 and 166 are provided on each side of the seal. The lip seals are in contact with the bottom surfaces of the counter bores 158 and 160.

Figure 9:
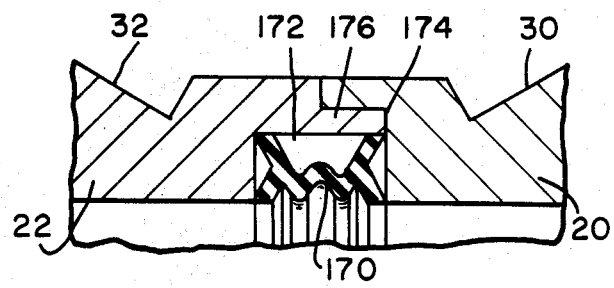
FIG. 9 is a fragmentary sectional view of a further embodiment of a seal arrangement when the inner end faces of the two inner races abut one another.

In the embodiment of FIG. 9, an accordian shaped seal 170 is enclosed in a counter bore 172 formed in the inner race 22. A counter bore 174 of larger diameter than the counter bore 172 in inner race 22 is formed in the inner race 20. An annular protrusion 176 on the inner face of inner race 22 extends into the counter bore 174 of inner race 20 with the surfaces of the protrusion being complementary to the surfaces of the counter bore 174.

Figure 10:
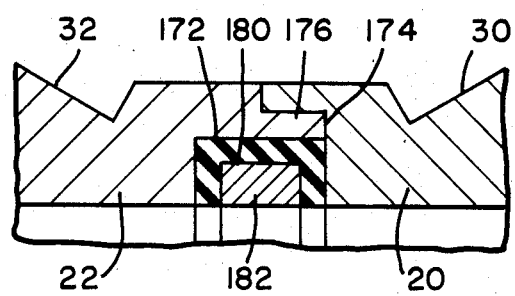
FIG. 10 is a fragmentary sectional view of a still further embodiment of a sealing arrangement when the inner end faces of the inner races abut one another.

In the sealing arrangement of the embodiment of FIG. 10, the seal includes an annular elastomeric seal 180 having an inverted U-shaped cross section. An annular metal band 182 is positioned in the channel of the seal.

Figure 12:
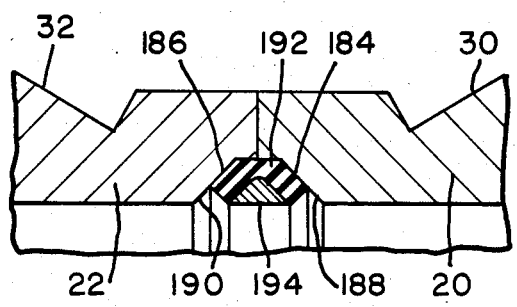
FIG. 12 is a sectional fragmentary view of a still further embodiment when the inner end faces of the inner races abut one another.

In the embodiment of FIG. 12, counter bores 184 and 186 are formed in the inner end faces of inner races 20 and 22, respectively. The bottom surfaces 188 and 190 of the counter bores 184 and 186, respectively, are inclined with the deep end of the counter bore being radially inward from the shallow end of the counter bore. An elastomeric seal having an inverted V cross section is enclosed in the counter bores. A metal band 194 having a triangular cross section is positioned in the channel of the inverted V-shaped seal.

Figure 13:
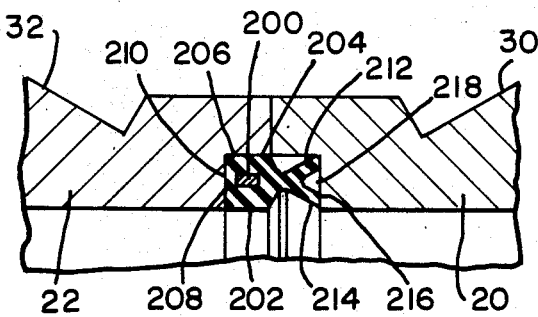
FIG. 13 is a fragmentary sectional view of a further embodiment of sealing arrangement when the inner end faces of the two races abut one another.

In the embodiment of FIG. 13, the seal includes a metal band 200 which is fully encased in an elastomeric annular member 202. The elastomeric 202 has a radial outside surface 204 which is complementary to the side surface of the counter bore 206 in the inner race 22. The elastomeric 202 also has a radially extending end surface 208 which is complementary to the bottom 210 of the counter bore 204. The elastomeric member also has a pair of integral annular open lips 212 and 214 in sealing engagement with the bottom surface 216 of the counter bore 218 in the inner end face of the inner race 20.

We claim:

1. A multirow bearing comprising: inner race means having a pair of intermediate raceways and a pair of end raceways, each end raceway tapering inwardly toward the axis of the bearing so that the small diameter ends of the end raceways are located toward the ends of the inner race means the ends of the inner race means having squared off end faces; outer race means having a pair of intermediate raceways surrounding the intermediate raceways of the inner race means and a pair of one-piece end races, each having an end raceway to provide end raceways surrounding the end raceways of the inner race means so that each raceway on the outer race means surrounds and corresponds to a different raceway on the inner race means and to provide an inner race means-outer race means annulus, the end raceway on each one-piece end race tapering inwardly toward the axis of the bearing so that the small diameter ends of the end raceways are located toward the outer ends of the one-piece end races, the outer ends of each one-piece end race extending along the same transverse plane through the axis of the bearing as the adjacent squared off inner race means end face; rollers arranged in rows between corresponding raceways of the inner and outer race means, there being a different row of rollers between each set of corresponding intermediate and end raceways, the rollers in the end racewasys being tapered rollers; individual end roller cages circumferentially separating said tapered rollers, each end roller cage having an outer end rim with a bore of larger diameter than the outside diameter of the adjacent part of the inner raceway means; and end seal fitted within the inner race means-outer race means annulus adjacent each end of said annulus, the end seals being configured to fit entirely within said annulus, each end seal having a generally C-shaped metal seal case in cross-section with the vertical portion of the C-shape extending generally along the same transverse plane as the adjacent outer race means one-piece end race outer end and inner race means squared off end face, the horizontal parts of the C-shaped metal seal case being a generally axially extending radially inner metal portion and a shorter generally axial extending radially outer portion, said radially inner metal portion extending into the corresponding end roller cage bore, each end seal also having an elastomeric portion attached to said generally axially extending inner metal portion and fitting substantially entirely within the corresponding end roller cage bore and cooperating with the inner race means to form barriers at the ends of the bearing.

2. A multirow bearing in accordance with claim 1 wherein: the end seals are press fit into the inner race means-outer race means annulus.

3. A multirow bearing in accordance with claim 1 wherein: the inside surface of the outer race means has a groove spaced axially from each of its ends; and axial retaining portions of each end seal fit into a groove to retain the end seal in the inner race means-outer race means annulus.

* * * * *